UNITED STATES PATENT OFFICE.

JOHN COWMAN AND SAMUEL B. BARBER, OF ROCHESTER, NEW YORK.

IMPROVEMENT IN THE MANUFACTURE OF ARTIFICIAL MARBLE.

Specification forming part of Letters Patent No. 163,977, dated June 1, 1875; application filed March 6, 1875.

*To all whom it may concern:*

Be it known that we, JOHN COWMAN and SAMUEL B. BARBER, both of the city of Rochester, in the county of Monroe and State of New York, have invented a certain new and useful Improvement in the Manufacture of Artificial Marbles and other Factitious Stones; and we do hereby declare that the following is a full, clear, and exact description of the same.

Our improvement relates to the manufacture of artificial marbles and other factitious stones, in which a variegated and tinted surface in imitation of the natural stone is produced.

The invention consists in the combination of certain materials with gypsum to form the compound; also, in the process of mixing and treating the compound, as hereinafter more fully described.

The body of the stone consists of superfine gypsum or plaster-of-paris, and this material is mixed with glue, gum-tragacanth, alum, and water, as follows: We dissolve these materials in soft water, in the proportion of one-half pound of glue, one ounce of gum tragacanth, two ounces of alum, and one gallon of water. These proportions may be varied at pleasure. When the liquid has cooled, the different colors (which should be mineral) intended for use are mixed with it in separate vessels, and stirred till the colors are thoroughly dissolved and held in solution. The colors should be finely ground previously. The gypsum or plaster-of-paris is then rapidly stirred into the separate vessels until the material acquires a plastic state of about the consistency of mortar for brick-work. The mass should now be constantly stirred for at least two hours with a mortar, or some other suitable instrument, in order that all of the particles of plaster may slake and expand. When this is done, the material (in different colors) is in condition for being molded.

Having procured a sample of the genuine stone to be imitated, we take the cement in any of the various colors from the different vessels, already described, and place them in the mold, using for this purpose small spoon-shaped instruments made of metal or wood, till the mold is covered with the cement to the desired thickness to form the facing of the slab. The manipulation of the instrument by the operator is such as to blend the various colors properly together, thereby imitating the spots, streaks, and mottled outlines of the natural stone. In this manner the thickness of the variegated slab may be such as to make a considerable body, and not be confined to a mere film or glazing on the surface, as in most factitious marbles. The surface is now troweled or smoothed over, so as to more effectually blend the colors, after which the mold may be slightly shaken and then laid away for one hour before the backing or filling is applied. The latter may be of a coarser quality of gypsum, with or without coloring, but combined with the glue, gum, and alum, as before described.

The casts are allowed to remain in the molds from twenty-four to forty-eight hours, according to the thickness of the cast, and the apartment should be of moderate temperature, as the setting or hardening must be gradual and not forced.

When the casts are taken from the molds, they are placed upon open or rack shelves, and allowed to stand from two to three days, when they may be taken down and the surface stoned or rubbed down, in the usual manner for treating natural marble. They are then laid away for forty-eight hours, when they may be taken down and polished, which is the finishing step.

The molds may be made of wood, plaster-of-paris, or glass prepared with a smooth surface. We prefer glass, however, as it is transparent, and enables the operator to see through and blend the colors more accurately before the composition has set.

We are aware that artificial marbles are known, made usually of hydraulic cement, which is expensive. By the treatment before described, and the employment of the materials named, we can use ordinary superfine gypsum, which reduces the cost at least fifty per cent. It is essential that the gypsum should be mixed and stirred with the other materials at least two hours before being placed in the molds, as before described, in order that it may become thoroughly slaked and swelled. It thereby loses all its powers of expansion, which enables the colors to be better blended, and also produces a more solid and homogeneous body, with finer grain and greater adhesiveness. The glue and gum neutralize, to a certain extent, the setting or hardening of the plaster in the molds, which gives time for the proper manipulation in building up the body and blending the colors. This is a very important matter, for when plaster is mixed alone with water, the setting is very rapid, owing to the rapid evaporation of the water. By thus retarding the action, time is given for making a body of any desired thickness, with the colors blended throughout, so that the slab may afterward be rubbed down and polished without danger of striking through into the neutral body of the slab. Ordinary factitious marbles have simply a thin glazing of the surface. The effect of retarding of the setting, as described, is owing to the slow evaporation of the glue and gum, as compared with water alone, said parts hardening very slowly, and thereby thoroughly seasoning the whole material.

In addition to the above, the glue, by reason of its adhesive qualities, holds the particles of plaster together, while the gum-tragacanth, by reason of its peculiar elasticity and ductility, makes the body of stone less liable to fracture than if the glue alone were used. It also renders the surface capable of receiving a higher polish, by reducing the brittleness of the same. The alum serves to harden and crystallize the grain of the stone.

This process can be applied not only in the manufacture of factitious marbles, but also of other kinds of stone, and in the manufacture of all kinds of articles.

We are aware that alum has been combined with gypsum in the manufacture of artificial marbles; also, that glue and alum have been combined with paris-white for marbleizing or covering surfaces of wood by what is known as the bath or dipping process; such we do not claim.

What we claim as new is—

1. The composition for making imitation stone, consisting of the combination, with gypsum, of glue, gum-tragacanth, and alum, compounded substantially as described, and for the purpose specified.

2. The process of forming artificial marbles and other factitious stones, by combining gypsum, glue, gum-tragacanth, and alum with mineral colors in separate vessels, and applying the colored cements by suitable instruments in building up a body or facing of the stone with the colors blended throughout, as described.

In witness whereof we have hereunto signed our names in the presence of two subscribing witnesses.

J. COWMAN.
S. B. BARBER.

Witnesses:
R. F. OSGOOD,
EDWIN B. SCOTT.